United States Patent [19]

Marin et al.

[11] Patent Number: 4,823,232

[45] Date of Patent: Apr. 18, 1989

[54] HIGH-VOLTAGE COMPRESSED-GAS CIRCUIT BREAKER

[75] Inventors: Heiner Marin; Dieter Noack, both of Berlin, Fed. Rep. of Germany

[73] Assignee: Siemens Aktiengesellschaft, Berlin, Fed. Rep. of Germany

[21] Appl. No.: 170,764

[22] Filed: Mar. 21, 1988

[30] Foreign Application Priority Data

Apr. 1, 1987 [DE] Fed. Rep. of Germany ... 8704828[U]

[51] Int. Cl.[4] .......................... H02B 5/00; H02B 7/00; H02G 15/02

[52] U.S. Cl. .................................. 361/335; 174/75 B; 439/171

[58] Field of Search .................. 174/12 BH, 19, 75 D, 174/80, 18, 31 R, 152 R; 200/146 A, 146 AA, 144 B, 148 G; 361/335; 439/171, 173, 174

[56] References Cited

U.S. PATENT DOCUMENTS

| | | | |
|---|---|---|---|
| 1,754,833 | 4/1930 | Mateer . | |
| 1,878,016 | 9/1932 | Steinmayer | 174/19 |
| 2,228,089 | 1/1941 | Skvortzoff | 174/12 BH |
| 2,660,631 | 11/1953 | Harrison . | |
| 3,352,988 | 11/1967 | Wachta et al. . | |
| 4,031,311 | 6/1977 | Mazanek | 174/31 R |

FOREIGN PATENT DOCUMENTS 2712066 9/1978 Fed. Rep. of Germany .

OTHER PUBLICATIONS

Siemens, SF-Leistungsschalter, 3AS1, 123-145kV, 31,5 . . . 40kA, SF circuit-breakers, 3AS1, 123-145-170kV, 31,5 . . . 40kA.

*Primary Examiner*—Roy N. Envall, Jr.
*Attorney, Agent, or Firm*—Kenyon & Kenyon

[57] ABSTRACT

A high-voltage compressed-gas circuit breaker having terminal plates with a contact face for incoming cables. The position of these contact faces and the attachment devices on the contact faces for the connection of the cables varies according to the form of installation given in the switching equipment. The contact faces are formed as a separate part from the terminal plate. On both the separate part and the terminal plate, bores for connection of the part and the plate are provided which do not affect the sealing by the terminal plates of the interior of the interrupter unit at its outer end faces. The bores permit an attachment of the separate part to the contact face in either a first position, or a second position which is rotated by 90° from said first position.

4 Claims, 1 Drawing Sheet

HIGH-VOLTAGE COMPRESSED-GAS CIRCUIT BREAKER

This application is related to commonly owned, co application Ser. No. 170,764, filed 3/21/88, for a "High-Voltage Compressed-Gas Circuit Breaker."

FIELD OF THE INVENTION

The present invention relates to a high-voltage circuit breaker, in particular a compressed-gas circuit breaker.

DESCRIPTION OF RELATED ART

In prior compressed-gas circuit breakers, the interrupter units are closed off at the outer end faces by terminal plates which comprise a contact face for cables that are attached there. Such a high-voltage circuit breaker, namely a compressed-gas circuit breaker filled with $SF_6$, is known from the Siemens publication "$SF_6$ Circuit breakers 3 AS1" (Catalog number E 122/1564-220). In that known circuit breaker, the contact faces are formed by shoulders at the terminal plates. This requires a plurality of differently designed terminal plates, since the alignment of the contact faces may change depending on the switching equipment in which the circuit breaker is to be installed. Similarly, the arrangement and dimensions of the attachment means on the contact faces with which the electric cables are attached, in particular overhead cables leading to the breaker may also change depending on the switching equipment. Because the terminal plates form a part that closes off the interior of the interrupter units, each individual breaker must be manufactured exactly in accordance with its intended use.

It is an object of the present invention to simplify the layout of the high-voltage circuit breaker by a different design of the terminal plates.

SUMMARY OF THE INVENTION

The above and other objects are achieved in the present invention by providing a high-voltage compressed-gas circuit breaker having at least one interrupter unit which is sealed off at its outer end faces by terminal plates. These terminal plates have contact faces for attachment by cables. At least one of the contact faces is a part that is separable from the terminal plate. Bores in the part and in the terminal plate receive means for attaching the part to the terminal plate. The bores in the terminal plate are arranged so as to prevent impairment of the sealing of the interior of the interrupter unit. The distribution of the bores in the terminal plate and the bores in the part is such as to permit the contact face to be attached to the terminal plate in either a first position, or a second position which is rotated by 90° from said first position.

It is the contact face for the incoming and outgoing cables which must be varied with respect to the different modes of installation of the circuit breaker in switching equipment. The present invention thus provides a contact face which is separate from the terminal plate. This terminal plate is at the same time part of the interrupter unit and closes its interior. The terminal plate is a structural part which is uniquely correlated with the interrupter unit, so that the manufacture of the interrupter unit, the circuit breaker and its filling with gas, can be fully completed without having to decide which variant of the contact face must be applied on the terminal plate.

The interchangeability of the contact faces is possible because the bores in the terminal plate for receiving the part with the contact face do not affect the closure of the interior of the interupter unit. Also, the bores are readily accessible from the outside. In addition, the distribution or arrangement of these bores is chosen so that the contact face can be rotated by 90° relative to the terminal plate. It is thus possible to accommodate practically all installation variations.

DETAILED DESCRIPTION

Figure 1:
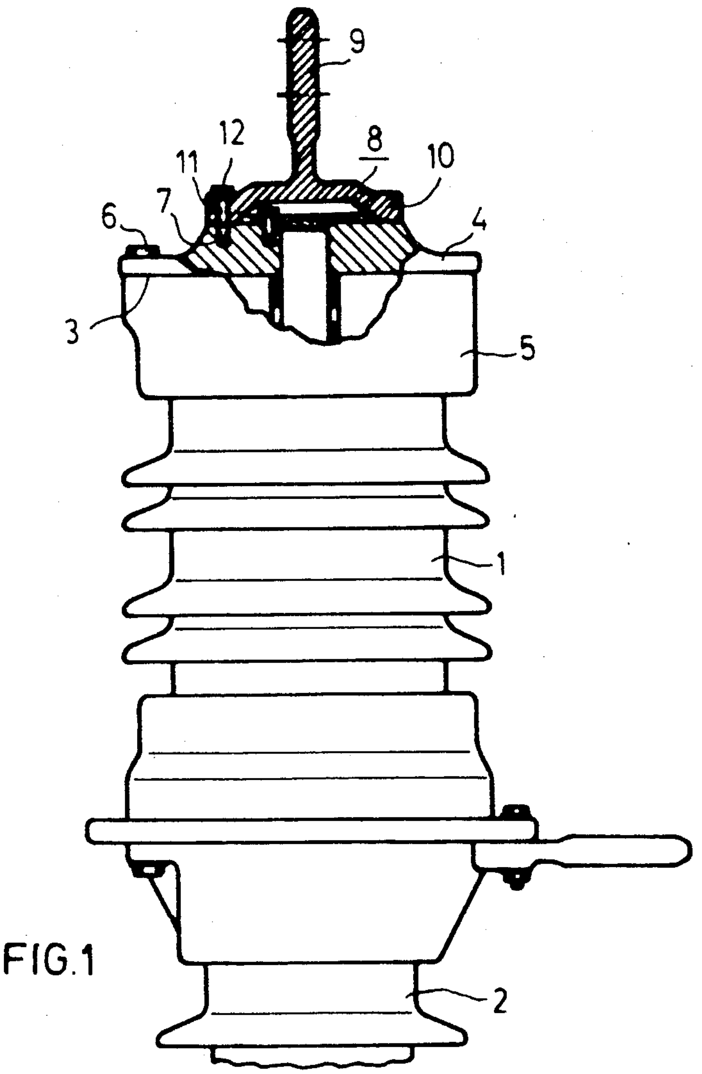
FIG. 1 is a partially sectioned view of an interrupter unit of a high-voltage circuit breaker
Figure 2:
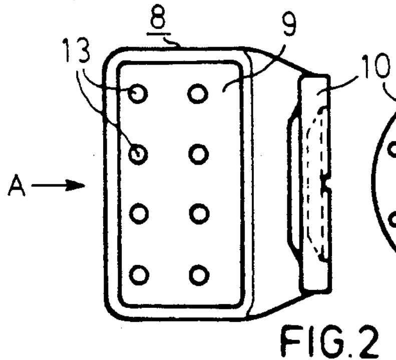
FIG. 2 shows a side view of a contact part with a contact surface.
Figure 3:
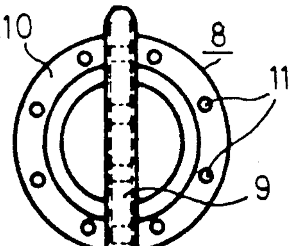
FIG. 3 shows a top view of the contact part in the direction of arrow A in FIG. 2.

In a high-voltage compressed-gas circuit breaker filled with $SF_6$, the interrupter unit 1 is arranged on a support column 2. The outer end face 3 of interrupter unit 1 is sealed gastight by a terminal plate 4. For this purpose, the terminal plate 4 is connected with the attachment flange 5 of interrupter unit 1 in suitable manner by bolts 6.

The terminal plate 4 contains threaded bores 7 uniformly distributed over a circular circumference and formed as blind holes. These threaded bores 7 allow the terminal plate 4 to be attached to a structural part 8 that has a contact face 9. The structural part 8 is separate from the terminal plate 4 and comprises a flange 10 which is set perpendicular to the contact face 9 and contains the bores 11 which allow attachment to the terminal plate 4. These bores 11 have the same distribution and lie on the same circular circumference as the threaded bores 7 in terminal plate 4. The distribution of the bores 7, 11 is chosen so that the contact face 9 on terminal plate 4 can be rotated by 90°. Structural part 8 is then attached to the terminal plate 4 in the desired position by screws 12.

Structural part 8 with the contact face 9 can be connected at any time to the hermetically closed interrupter unit 1 of the high-voltage circuit breaker or be removed again without affecting the readiness of the gas-filled circuit breaker for operation, because the interrupter unit 1 need not be opened for that purpose. This permits easy adaptation of the contact face 9 to altered installation conditions, both with respect to its position, allowing it to be reversed by 90°, and with respect to the arrangement and dimensions of the attachment bores provided in the contact face 9. These attachment bores 13 receive the attachment means with which the connection to the incoming and outgoing overhead cables, not shown, is carried out. If the requirements with respect to arrangement and dimensions of these attachment bores 13 on the contact face 9 are changed, due to different standards for example, exchange of the structural parts 8 can therefore be done in a very simple manner.

What is claimed is:

1. A high-voltage compressed-gas circuit breaker, comprising:

at least one interrupter unit which is sealed off at its outer end faces by terminal plates, said terminal plates having contact faces for attachment by cables, at least one said contact face being a part separable from said terminal plate; and bores in said part and in said terminal plate for receiving means for attaching said part to said terminal plate, said bores in said terminal plate arranged so as to prevent impairment of sealing of an interior of said interrupter unit, wherein distribution of said bores in said terminal plate and said bores in said part is such as to permit said contact face to be attached to said terminal plate in at least one of a first position and a second position which is rotated by 90° from said first position.

2. A high-voltage circuit breaker according to claim 1, wherein said part has a flange that is perpendicular to said contact face and which includes said bores of said part.

3. A high-voltage circuit breaker according to claim 2, wherein said bores in said flange and in said terminal plate are uniformly distributed on a same circular circumference.

4. A high-tension circuit breaker according to claim 1, wherein said bores in said terminal plate are blind bores.

* * * * *